2,741,531

METHOD FOR CHANGING THE PHYSICAL STATE OF METAL-FREE PHTHALOCYANINE PIGMENTS AND USE OF SOLUTION OF SAME FOR DYEING

Charles John Pedersen, Salem, N. J., assignor to E. I. du Pont de Nemours and Company, Wilmington, Del., a corporation of Delaware No Drawing. Application May 15, 1952,
Serial No. 288,019

9 Claims. (Cl. 8—7)

This invention relates to a method for changing the physical state of metal-free phthalocyanine pigments. More particularly this invention deals with a process for forming solutions of metal-free phthalocyanine or its water-insoluble substitution derivatives whereby to make these colors available for dyeing cellulosic fiber.

It is an object of this invention to provide a method for dyeing cellulosic fibers such as textile fibers or paper with colors of the phthalocyanine series. Various additional objects and achievements of this invention will appear as the description proceeds.

As is well known, the phthalocyanine pigments are as a rule too insoluble for application to fiber from an aqueous bath. Many attempts have been made in the art to solubilize these compounds by introducing into their molecules various substituents, for instance sulfo groups. The resulting compounds have in some cases sufficient affinity for textile fiber to produce a dyeing of satisfactory strength, but the introduction of the mentioned substituents customarily has some detrimental side effects on the color, for instance by diminishing the good light-fastness and heat-stability, which have been the most valuable attributes of the phthalocyanine colors. Also, the shade of the color produced on the fiber is that of the substitution derivative, which is often not the same as the shade of the original metal or metal-free phthalocyanine.

Now according to this invention, the above problem is solved by a new method for changing the physical state of metal-free phthalocyanine pigments whereby to transform the same from the solid state into the form of a solution. The solution is not an aqueous one. Instead, it is a solution of the color in a solvent from a selected group, as more particularly set forth hereinbelow. But the solution is capable of penetrating cellulosic fiber, and when the impregnated fiber is subsequently treated with water or with a salt of copper or nickel, the initial metal-free phthalocyanine or the corresponding metal phthalocyanine is generated within the fiber, thus giving a dyeing corresponding in shade to the true color of the initial phthalocyanine or the corresponding metal phthalocyanine, as the case may be. Moreover, the dyeing retains the original light fastness of the color, and possesses furthermore excellent fastness to washing, soaping and crocking.

My novel method of forming a solution of a metal-free phthalocyanine pigment consists of treating the initial color, for instance metal-free phthalocyanine or a halogen derivative thereof, in an alcoholic solvent as more fully defined below, with a strongly basic compound of an alkali-metal, for instance a hydroxide, alkoxide or hydride of sodium or potassium.

The alcoholic solvents found suitable for my invention may be defined as liquid, saturated alcohols having from 2 to 12 C-atoms per molecule and being members of the group consisting of primary and secondary open chain alcohols, cyclohexanols, and lower alkoxy ethanols. Typical specific illustrations are: ethanol (anhydrous), isopropanol, n-butanol, sec-butanol, n-amyl alcohol, iso-amyl alcohol, sec-isoamyl alcohol, n-octyl alcohol, n-dodecyl alcohol, ethylene-glycol monomethyl ether, the corresponding monoethyl and monobutyl ethers, and cyclohexanol. Best results are obtained with those members of the above group which contain from 4 to 8 C-atoms per molecule.

Although I do not wish to limit this invention to any particular theory, it appears to me that the basic compound reacts with the phthalocyanine to form an alkali-metal salt thereof, i. e., replacing the two central hydrogen atoms by sodium or potassium, respectively, while the solvent in some manner forms a loose addition compound, or "solvate," with the resulting salt.

The quantity of the alkali-metal base should be not less than 2 moles per mole of phthalocyanine. Considerably larger quantities, however, may be employed, except for considerations of economy. The reaction is best effected in the total absence of water. In some instances, however, a small quantity of water may be needed to assist in dissolving the alkali-metal compound. In such cases, the quantity of water added should be kept to a minimum, or else the quantity of basic compound should be increased.

Water has a decomposing effect on the solvate formed. It is therefore necessary to keep the quantity of water present at a minimum, and it is desirable to have the quantity of alkali-metal hydroxide as large as is practicable within economic limits.

In the next step of my invention, the solution of color above formed is applied to cellulosic fiber. In the case of textile fiber it is preferable to subject the fiber first to a wetting-out treatment, to open its pores. This may be achieved in any convenient manner, for instance by boiling the fiber successively in water and in a liquid monoalkyl ether of ethylene glycol. Impregnation may be effected in any convenient manner, for instance by immersion or spraying, or by printing the fiber with the color solution.

The next step is decomposition of the solvated color within the fiber. This may be effected simply by rinsing the treated fabric with water at room temperature or at any other convenient temperature up to the boiling point, or if desired by steaming the impregnated fiber in a customary steam ager. This treatment results in precipitation of the original phthalocyanine within the fiber. The fabric is then soaped to remove any loose pigment, and dried.

An alternative method of decomposing the solvated color is to treat the impregnated fabric with a metal salt, preferably a salt of copper or nickel, in an organic solvent. Suitable salts for this purpose are the chlorides, sulfates, nitrates and acetates. Suitable solvents are alcohols of the same group hereinabove discussed.

To facilitate solution of the salt in the solvent, it is best to employ an ammine salt of the chosen metal or to add to the solvent ammonia or an organic amine to form an ammine salt in situ. The treatment may again be carried out at room temperature or at a higher temperature if specially desired.

In this modification of my invention the color precipitated in the fiber is copper phthalocyanine or nickel phthalocyanine, depending on the metal selected, or the corresponding metal-polychloro-phthalocyanine if a polychloro metal-free phthalocyanine was initially employed.

Without limiting my invention, the following examples are given to illustrate my preferred mode of operation. Parts mentioned are by weight.

PART A.—DISSOLUTION OF THE COLOR

*Example 1*

Two parts of finely divided metal-free phthalocyanine were suspended in 1800 parts of ethylene glycol monoethyl ether, and 3 parts of sodium hydride were added with shaking. A blue-green solution was produced, from a sample of which metal-free phthalocyanine was reprecipitated upon dilution with an excess of water. Cotton which was impregnated with the solution and then rinsed with water and soaped to remove unfixed pigment, was dyed a pleasant blue shade.

*Example 2*

One part of finely divided metal-free phthalocyanine was suspended in 50 parts of ethylene glycol monoethyl ether, and one part of sodium methoxide was added. A blue-green solution was produced. Hydrolysis of this solution by excess water reprecipitated metal-free phthalocyanine.

*Example 3*

Two parts of finely divided polychloro metal-free phthalocyanine (over 45% Cl) were added to a solution of 1 part of potassium hydroxide in 60 parts of ethylene glycol monoethyl ether and 2 parts of water. The mixture was warmed to 50° C. and agitated for 5 minutes. After clarification and cooling a deep green solution was obtained. When a sample of this solution was poured into several times its volume of water, the initial pigment was reprecipitated.

PART B.—DYEING OF FIBER

*Example 4*

A piece of cotton which had been swollen by boiling for 5 minutes in water and then for 5 minutes in ethylene glycol monomethyl ether was impregnated with the solution prepared in Example 1, and then rinsed with water. After soaping at the boil for 15 minutes in a 0.5% soap solution, a green-blue dyeing was obtained which exhibited good fastness to washing and crocking.

If desired, hydrolysis of the phthalocyanine salt solution may be effected by steaming the cotton, rather than rinsing it in water.

Paper or regenerated cellulose may be dyed by the above procedure, except that the preliminary boiling-out treatment is omitted in the case of paper. Also, in lieu of steaming or rinsing, repeated dipping in warm water is recommended for hydrolysis of the phthalocyanine solution on paper goods.

*Example 5*

One part of finely divided polychloro phthalocyanine was suspended in 50 parts of ethylene glycol monoethyl ether, and 1 part of sodium methoxide was added. A green solution was produced which was used to impregnate a piece of cotton which had been swollen by boiling for 5 minutes in water and then for 5 minutes in ethylene glycol monoethyl ether. The treated cotton was dipped in water and then soaped briefly in a boiling 0.5% soap solution. A green dyeing was produced which exhibited excellent fastness to washing and crocking and to treatment with dilute sodium hypochlorite solution.

*Example 6*

One part of finely divided polychloro phthalocyanine was added to a solution of 1 part of sodium hydroxide in 25 parts of methanol and 25 parts of ethylene glycol monoethyl ether. The mixture was warmed to 40° C., whereupon a blue-green solution was obtained. After clarification this solution was used to impregnate a piece of cotton. The treated cotton was rinsed with water, and then soaped briefly at the boil in a 0.5% soap solution. A green dyeing was obtained which exhibited excellent fastness to washing and crocking, and to treatment with dilute sodium hypochlorite solution.

*Example 7*

Two parts of finely divided phthalocyanine were suspended in 200 parts of ethylene glycol monomethyl ether, and 3 parts of sodium hydride were added with shaking. A blue-green solution was obtained. A piece of cotton which had been swollen by boiling for 5 minutes in water and then for 5 minutes in ethylene glycol monomethyl ether was impregnated with this solution, and then transferred to a bath containing 1 part of anhydrous cupric chloride and 1 part of ethylene-diamine in 200 parts of ethylene glycol monomethyl ether. A blue-dyeing was obtained which was rinsed with water and then soaped for 15 minutes at the boil in a 0.5% soap solution. The dyeing possessed the rich blue shade of copper phthalocyanine, and exhibited excellent fastness to light, crocking, washing, and bleaching with dilute sodium hypochlorite solution.

The ethylene-diamine may be omitted from the above procedure, but more even dyeings are obtained when it is used.

*Example 8*

A piece of cotton which had been swollen by boiling for 5 minutes in water and then for 5 minutes in ethylene glycol monoethyl ether was impregnated with the solution obtained in Example 3, pressed partly dry and transferred at once to a solution of 2 parts of anhydrous cupric chloride and 2 parts of ethylene-diamine in 60 parts of ethylene glycol monoethyl ether. The cotton piece was rinsed in water and then soaped at the boil for 15 minutes in a 0.5% soap solution. A bright green dyeing was obtained which exhibited excellent fastness to light, crocking, washing, and bleaching with dilute sodium hypochlorite solution.

When the procedures of Examples 7 and 8 are repeated except using anhydrous nickel chloride in lieu of the cupric chloride therein specified, similar results are obtained. Similar results are also obtained by using the nitrates, sulfates and acetates of copper and nickel, in lieu of the chlorides.

The above procedures may also be applied to the dyeing of regenerated cellulose fiber or paper.

Numerous other variations in details, will be readily apparent to those skilled in the art.

I claim as my invention:

1. A process of changing the physical state of a non-solubilized metal-free phthalocyanine pigment of the group consisting of metal-free phthalocyanine and halogenated metal-free phthalocyanine, which comprises reacting upon the same, at a temperature not exceeding 50° C., with an alkaline compound selected from the group consisting of the hydroxides, alkoxides and hydrides of the alkali-metals in a liquid alcoholic solvent selected from the group consisting of the cyclohexanols, primary and secondary open chain alcohols having from 2 to 12 C-atoms per molecule, and the lower alkoxy ethanols, the quantity of said alkaline agent being not less than 2 moles per mole of the metal-free color employed, whereby to effect dissolution of the color in said alcoholic solvent.

2. A process as in claim 1, the alcoholic solvent being a liquid monoakyl ether of ethylene glycol.

3. A process of dyeing cellulosic fiber, which comprises dissolving a phthalocyanine pigment of the group consisting of metal-free phthalocyanine and halogenated metal-free phthalocyanine in an alcoholic solvent as specified in claim 1, by a process as set forth in claim 1, impregnating the fiber with the resulting solution, and developing the color on the fiber by treatment with an agent of the group consisting of water and organic solutions of metal salts whereby to regenerate a phthalocyanine pigment within the fiber.

4. A process of dyeing cellulosic fiber, which comprises treating metal-free phthalocyanine with an alkaline compound from the group consisting of the hydroxides, alkoxides and hydrides of the alkali-metals in a liquid alcoholic solvent selected from the group consisting of the cyclohexanols, primary and secondary open chain alcohols having from 2 to 12 C-atoms per molecule, and the lower alkoxy ethanols, whereby to effect dissolution of the color in said alcoholic solvent, impregnating the fiber with the resulting solution, and treating the impregnated fiber with water, whereby to regenerate a metal-free phthalocyanine within the fiber.

5. A process of dyeing cellolosic fiber, which comprises treating metal-free phthalocyanine with an alkaline compound from the group consisting of the hydroxides, alkoxides and hydrides of the alkali-metals in a liquid alcoholic solvent selected from the group consisting of the cyclohexanols, primary and secondary open chain alcohols having from 2 to 12 C-atoms per molecule, and the lower alkoxy ethanols, whereby to effect dissolution of the color in said alcoholic solvent, impregnating the fiber with the resulting solution, and treating the impregnated fiber with a solution of a metal salt in an organic solvent, the metal salt being selected from the group consisting of copper salts and nickel salts, whereby to precipitate within the fiber the corresponding metal phthalocyanine.

6. A process as in claim 5, the organic solvent being a lower alkyl ether of ethylene glycol.

7. A process of dyeing cellulosic fiber, which comprises treating metal-free phthalocyanine with an alkaline compound from the group consisting of the hydroxides, alkoxides and hydrides of the alkali-metals in a liquid monoalkyl ether of ethylene glycol, whereby to effect dissolution of the color in said solvent, impregnating the fiber with said solution, and then treating the fiber with water whereby to regenerate metal-free phthalocyanine within the fiber.

8. A process of dyeing cellulosic fiber, which comprises treating metal-free phthalocyanine with an alkaline compound from the group consisting of the hydroxides, alkoxides and hydrides of the alkali-metals in a liquid monoalkyl ether of ethylene glycol, whereby to effect dissolution of the color in said solvent, impregnating the fiber with said solution, and then treating the fiber with a solution of cupric chloride in a lower alkyl ether of ethylene glycol, whereby to precipitate copper phthalocyanine within the fiber.

9. A process of dyeing cellulosic fiber, which comprises treating metal-free phthalocyanine with an alkaline compound from the group consisting of the hydroxides, alkoxides and hydrides of the alkali-metals in a liquid monoalkyl ether of ethylene glycol, whereby to effect dissolution of the color in said solvent, impregnating the fiber with said solution, and then treating the fiber with a solution of nickel chloride in a lower alkyl ether of ethylene glycol, whereby to precipitate nickel phthalocyanine within the fiber.

References Cited in the file of this patent

UNITED STATES PATENTS

| | | |
|---|---|---|
| 357,281 | Holliday | Feb. 8, 1887 |
| 385,426 | Pennington | July 31, 1888 |
| 2,116,602 | Heilbron | May 10, 1938 |
| 2,122,137 | Gassner et al. | June 28, 1938 |
| 2,124,299 | Holzach et al. | July 19, 1938 |

OTHER REFERENCES

Journal Chem. Soc. (London), 1934, pps. 1024, 1026 and 1027.